(12) United States Patent
Roberts et al.

(10) Patent No.: US 6,937,614 B1
(45) Date of Patent: Aug. 30, 2005

(54) TRANSPARENT PORT FOR HIGH RATE NETWORKING

(75) Inventors: Kim B. Roberts, Nepean (CA); Richard R. Habel, Kanata (CA)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/438,516

(22) Filed: Nov. 12, 1999

(51) Int. Cl.[7] .................................................. H04J 3/16
(52) U.S. Cl. ......................................................... 370/465
(58) Field of Search ................................ 370/370, 465, 370/252, 503–505, 210, 463–468, 355, 401–404, 535, 253; 713/500–503; 709/238, 220–235; 455/503, 509, 522, 64; 340/825.54

(56) References Cited

U.S. PATENT DOCUMENTS

| | | | | |
|---|---|---|---|---|
| 5,649,100 A | * | 7/1997 | Ertel et al. ................... | 709/225 |
| 5,712,628 A | * | 1/1998 | Phillips et al. .......... | 340/825.54 |
| 5,912,888 A | * | 6/1999 | Walsh et al. ................. | 370/355 |
| 5,913,172 A | * | 6/1999 | McCabe et al. ............. | 455/503 |
| 5,930,231 A | * | 7/1999 | Miller et al. ................. | 370/210 |
| 6,122,281 A | * | 9/2000 | Donovan et al. ............ | 370/401 |
| 6,167,062 A | * | 12/2000 | Hershey et al. ............. | 370/503 |
| 6,212,566 B1 | * | 4/2001 | Vanhoof et al. ............. | 709/230 |

FOREIGN PATENT DOCUMENTS

| | | | | |
|---|---|---|---|---|
| EP | 0 874 488 A2 | 10/1998 | ............. | H04J/3/08 |
| EP | 1 052 794 A2 | 11/2000 | ............. | H04J/3/16 |
| EP | 1 067 722 A | 1/2001 | ............. | H04J/3/16 |

OTHER PUBLICATIONS

Gruber, J., "Performance and fault management functions for the maintenance of SONET/SDH and ATM transport networks", Proceedings of the International Conference on Communications (ICC), Geneva, May 23–26, 1993, New York, IEEE, U.S., vol. 3, May 23, 1993, pp. 1308–1314.

* cited by examiner

*Primary Examiner*—Chi Pham
*Assistant Examiner*—Prenell Jones
(74) *Attorney, Agent, or Firm*—Steubing McGuinness & Manaras LLP

(57) ABSTRACT

A transparent port which maps continuous format signals of an arbitrary rate into frames of a pre-selected single common rate, is provided with a programmable link termination/instigation, for example a FPGA. The port identifies the rate of the continuous signal, recognizes its protocol and the FPGA is configured accordingly. FPGA performs framing, counts errors, does code conversion, corrects parity and performs any other performance monitoring specific to the protocol. In this way, the continuous format signal may be carried transparently as a tributary of e.g. a SONET network, and the performance parameters for the previous section, such as the previous section fail, may be reported to the far end.

31 Claims, 2 Drawing Sheets

TRANSPARENT PORT FOR HIGH RATE NETWORKING

BACKGROUND OF THE INVENTION

1. Field of the Invention

The invention is directed to communication systems that transport signals of an arbitrary data format via a standard synchronous format, and more particularly to detecting operation parameters for the previous section of such communication systems.

2. Background Art

Increasing deployment of optical fiber transmission systems with large cross-sections supported on a few strands of fiber have increased concern about survivability and management of such large optical networks. In addition to the growing size of the networks, the speed of the signals increases, as they evolve from analog to digital and from voice to data and video.

Evolution of the current transport networks is hindered by a number of constraints. For example, the networks operate according to fiber specific transmission protocols, each having different levels of operation, administration, maintenance and provisioning (OAM&P) functionality, so that the nodes must be equipped with protocol-specific hardware and software. In addition, handling a plurality of protocols at speeds over 100 Mb/s poses real problems to current generation of microprocessors.

One way to increase the speed (and bandwidth) of the network is to replace the electronics components with optical components. The increased transport capacity requirements are also meet by the introduction of point to point optical fiber systems, carrying TDM signals. An example of a TDM network is SONET/SDH, which transports hierarchically multiplexed lower rates tributaries into a higher rate TDM signal. SONET/SDH is a physical layer technology which is currently used as a transport service for ATM, SMDS, frame relay, T1, E1, etc. SONET/SDH provides the ability to combine and consolidate traffic from different locations through one facility (grooming), and reduces the amount of back-to-back multiplexing. More importantly, network providers can reduce the operation cost of their transmission network by using the comprehensive OAM&P features of SONET. For a service, being able to be easily transported by a SONET/SDH network is a valuable attribute, since the network provider can make use of the large base of installed SONET-compatible equipment.

On the other hand the SONET/SDH network is designed for certain tributary rates only, so that in many cases a user signal needs to undergo a mapping operation to be able to be transported by SONET/SDH. For example, Bellcore TR-0253 describes in detail standard mappings of common asynchronous transmission formats such as DS0, DS1, DS2, DS3, into SONET. Similar mappings are defined for the ETSI hierarchy mapping into SDH.

There are other standards or proprietary schemes that allow transportation of a very specific set of signals, with format specific hardware and hardware for processing the maintenance information. These methods of mapping cannot be used to map rates that vary significantly from the standard, and a different hardware is generally required to perform the mapping for each type of signal.

The speed and bandwidth of the communication networks has been further increased by the introduction of the optical network layer with optical switching (WDM network), controlled through a network management system. Such an optical layer could be made transparent to data rates and formats.

In addition, there is a current trend to unify the transmission protocols, for creating an open, transparent transport network that uses common equipment and software. Ideally, such a protocol and bit rate transparent transport network needs to provide appropriate mechanisms for delivering the client signals at the far end with minimal cost and with enough OAM&P information for allowing error correction. Due to the advantages listed above, adapting SONET/SDH protocols to the transparent transport network appears to be the solution of choice.

Patent application Ser. No. 09/349,086 (Roberts), entitled Mapping Arbitrary Signals into SONET, filed on Jul. 8, 1999 and assigned to Nortel Networks Corporation discloses an efficient method and a synchronizer for mapping arbitrary signals into SONET such that the signals can be recovered with low timing jitter at low cost at the far end. This mapping method can be used for tributaries of almost any continuous format. The synchronizer could recognize selected protocols, frame on them, and do the corresponding performance monitoring.

However, protocols not known to the manufacturer, or not yet defined, cannot be recognized with prior art mapping methods. Furthermore, performance monitoring is still a major unresolved technical problem when designing a transparent tributary, particularly at signal rates higher 100 MB/s, which are generally too fast for a microprocessor to perform measurement functions.

Of major importance is detecting the previous section fail. As the name suggests, previous section fail indicates if a signal was degraded over the last section of the network, or upstream, over the previous section. For example, most service providers need positive evidence if a problem occurred outside their network (in the received signal), or within their network. Specifically, if a user experiences performance problems on the signal that it receives, the service provider has to be able to determine if the signal was degraded when initially passed to it, or if the problems are in its network.

Bellcore TR-00253 Issue 6 provides for determination of previous section fail for SONET. No recommendations are yet available for transparent tributaries.

SUMMARY OF THE INVENTION

It is an object of this invention to provide a transparent tributary mapping system with a means for performance monitoring of the previous section.

According to one aspect of the invention, there is provided a transparent port for a high rate network comprising, a receiver unit for receiving an incoming signal of an arbitrary data rate R1 and extracting a user signal and a data clock, a programmable link termination PLT for reporting a set of performance parameters for said incoming signal, and a processing unit for recognizing a plurality of provisioned protocols, selecting a first protocol characterizing said incoming signal and configuring said PLT according to said first protocol.

According to a further aspect of the invention there is also provided transparent port for a high rate network comprising, a programmable link instigation PLI for reporting a set of performance parameters for a data signal of an arbitrary rate R1', a processing unit for recognizing a plurality of provisioned protocols, selecting a first protocol characterizing said data signal and configuring said PLI according to said first protocol, and a transmitter unit connected to said PLI for launching an outgoing signal of said first protocol, comprising user information within said data signal.

According to yet another aspect of the invention, there is further provided a method for transmitting a continuous digital signal of an arbitrary rate R1 over a synchronous network as a transparent tributary, comprising, at a transmit terminal, selecting a container signal of a rate R, higher than said rate R1, detecting the rate R1 of said continuous digital signal and determining a first protocol corresponding to said rate R1, measuring according to a first protocol a set of performance parameters on said continuous signal and reporting said set of performance parameters, and translating said set of performance parameters from said first protocol to a second protocol characterizing said container signal and providing said translated set into said container signal.

Advantageously, the invention provides a rather simple solution for detection of OAM&P parameters, such as e.g. the previous section fail, for signal rates at 10 Gb/s or higher.

BRIEF DESCRIPTION OF THE DRAWINGS

The foregoing and other objects, features and advantages of the invention will be apparent from the following more particular description of the preferred embodiments, as illustrated in the appended drawings, where.

DESCRIPTION OF THE PREFERRED EMBODIMENT

For the purpose of this invention, a transparent port is a data terminal which maps, and respectively reverse maps, data of arbitrary rates R1 into, and respectively from, a synchronous container of rate R. Term 'arbitrary' is used for rates R1 of the incoming signal in the range of ±20% of the port clock, and a variety of formats. "Format" or 'protocol' is used to define the type of the signal, such as SONET OC—N, 1GE, DS-n, etc.

Figure 1:
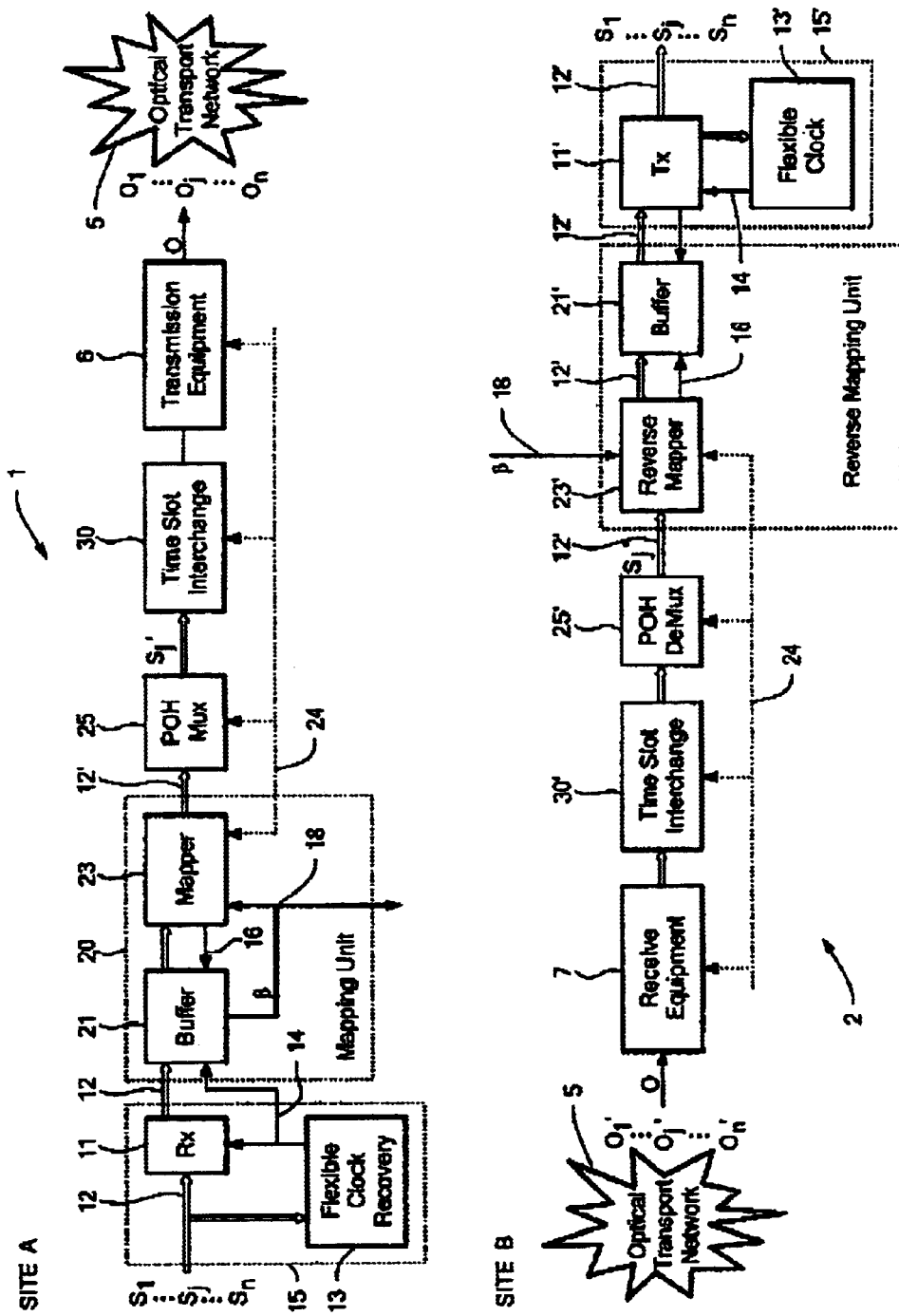
FIG. 1 is the functional block diagram of a transparent port.

The configuration of such transparent ports 1 and 2 is illustrated in FIG. 1 and described in the co-pending patent application Ser. No. 09/349,086, which is incorporated herein by reference. To summarize, transparent port 1, or synchronizer at site A, maps a continuous signal $S_j$ received from a local user into a SONET container of an appropriate size, and transmits the container to a far end transparent port 2 at site B, over an optical transport network 5. For the purpose of this invention, a local user is a terminal, or an access network, etc. For example, network 5 may be a short reach optical network which operates at 1310 nm.

The transparent port 2 recovers the SONET signal received from site A, extracts (reverse maps) the continuous format signal from the SONET container, and provides it to the local user at site B. Similar transparent ports may be provided for parallel mapping of more signals, shown as $S_1$ to $S_n$. In addition, the data terminal at site A may comprise one or more transparent receive ports, or de-synchronizers, as is transparent port 2 shown at site B.

At the transmit side, the size of the container for each signal S, is selected in software, so as to provide a satisfactory bandwidth usage for a large range of continuous format signals. For example, if a nxSTS-12 is used for the envelope, n is between four and twenty for a high speed version of the synchronizer, and between one and five for a medium speed version. Use of the lower speed version for lower rates avoids stranding significant network capacity.

The synchronizer comprises a receiver unit 15 equipped with a receiver 11 and a flexible clock recovery unit 13 which recovers data 12 from the input signal $S_j$. It is to be understood that site A could be equipped with signal converters (not shown) if the input signal is not in electronic format. Flexible clock recovery unit 13 could be for example the frequency agile PLL disclosed in the U.S. patent application "Apparatus and Method for Versatile Communication" (Habel et al), Ser. No. 09/218,053, filed 22 Dec. 1998, and assigned to Nortel Network Corporation. The design of the flexible clock recovery unit 13 allows recovery of a broad continuous range of bit-rates, with practically no conceptual limit on the range.

The data bits of the input signal $S_j$ are mapped into the respective SONET frame with evenly interspersed fixed stuff bits and adaptive stuff bits by a mapping unit 20. A mapping unit 20 divides the frame of $S_j$ into evenly sized blocs, and determines the number of fixed stuff bits for each block. Since the rate of the signal $S_j$ is not known in advance, the number of the variable stuff bits is determined on the go, based on a function β which gives information about the phase difference between the two clocks.

Mapping unit 20 comprises a flexible buffer 21 and a mapper 23. Buffer 21 generates β during processing of the current block, and this β is used for mapping of the next block. The value of β gives the position of the variable stuff bits and the number of the valid bits in the next block. Buffer 21 receives the bits of a block at the recovered clock rate and transmits the bits to the mapper at the rate of a gapped clock 16. Gapped clock 16 is derived from the SONET clock 24, and is discontinued at appropriate phase instances. The discontinuities (gaps) are given by β and by the number of fixed stuff bits.

The mapper 23 defines a valid location, which is a location for a data bit, and an invalid location, which is a location for a stuff bit, and provides an output signal 12' with the stuff bits (fixed and variable) distributed uniformly within the frame.

After the mapping operation, block 25 places the path overhead (POH) information into the appropriate fixed stuff bit positions, and the time slot interchange unit 30 re-arranges the POH bits in the frame so that SONET/SDH equipment in the optical network 5 can recognize the frame. Signal $S_j'$ is then converted into an optical signal $O_j'$ which is transmitted towards terminal 2 over network 5. The circuits involved in the transmission of the signal are generally referred to as transmission equipment 6.

The de-synchronizer effects the reverse operation by absorbing the fixed stuff bits and the adaptive stuff bits to regenerate $O_j$. The de-synchronizer receives the respective $O_j'$ signal, and recovers the data $S_j'$ in electrical format by receive equipment generally designated by 7. The time slot interchange unit 30' and the POH demultiplexer 25' extract the POH information from the corresponding timeslots using SONET clock 24, and provide signal 12' with the data and stuff bits to a reverse mapping unit 20'. Reverse mapping is performed in reverse mapper 23' based on β and SONET clock 24 available locally. Buffer 21' receives signal 12' at the rate of gapped clock 16, while data is extracted from the buffer at the rate of the data clock 14. Transmit unit 15' receives the signal with the original proprietary protocol and data rate, and transmits $O_j$ to the local client in optical format. Depending on the user particulars, means for converting the signal may also be provided at site B. For example, if the user is an optical access network, $S_j$ will be converted to an optical format.

β, which is determined at site A during the mapping operation, is communicated to site B for the reverse mapping. Similarly, clock 14 and frame rate are signalled to site B from site A.

Figure 2:
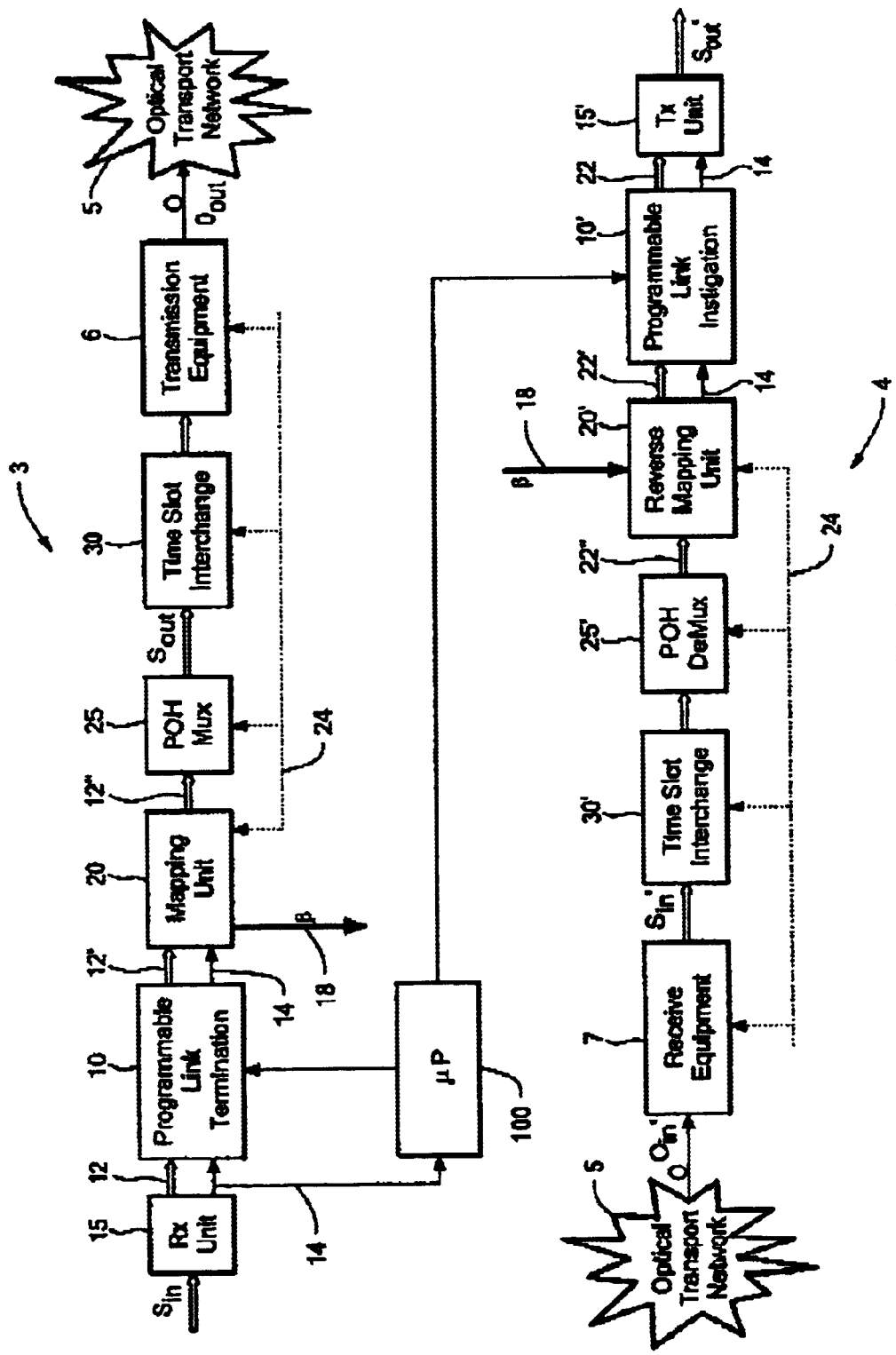
FIG. 2 shows the functional block of a single data flow through a bidirectional transparent port, according to an embodiment of the invention.

FIG. 2 shows the functional block diagram of a bidirectional transparent port with detection of the previous section parameters capability according to the invention. Signal processing in the transmit direction involves a synchronizer 3 which maps the user signal $S_{in}$ of an arbitrary rate R1 into a synchronous signal $S_{out}$ of a standardized rate R, and transmit the optical variant $O_{out}$ over an optical transport network 5. Signal processing in the receive direction involves a de-synchronizer 4 which performs a reverse mapping operation to recover the user signal $S_{out}'$ of rate R1' from a synchronous signal $O_{in}'$ of rate R', received from the optical transport network 5. It is evident that a transparent port with a de-synchronizer similar to 4 must be provided at the far end for reverse mapping signal $S_{in}$ from synchronous signal $S_{out}$. Also a transparent port with a synchronizer as shown at 3 could present at the same or at a different transparent port for mapping Sout' into $O_{in}'$.

The description is provided assuming that the signals are mapped into a SONET/SDH format, which are extensively used for high rates. Nonetheless, the synchronizer 3 and de-synchronizer 4 may operate using non-SONET/SDH formatted signals. In addition, FIG. 2 illustrates a transmission equipment block 6 and a receive equipment block 7 at the interface with the optical network 5, which perform general transmit and receive functions. For example, block 6 is involved in launching the signal over network 5 and may include multiplexers, TOH processors, TDM or WDM devices, long-reach transmitters, modulators, etc. Similarly, block 7 is involved in receiving the signal from the network 5 and may include de-multiplexers, TOH processors, TDM or WDM devices; etc. Furthermore, FIG. 2 does not show all units on the user sides.

Transparent port 3 includes a receiving unit 15 which identifies the bit rate R1 of an incoming signal $S_{in}$ presented to it, using a flexible clock recovery unit, as shown in FIG. 1. Receiving unit 15 recovers the user signal 12 from the incoming signal based on the recovered data clock 14.

The transparent port 3 is also provided with a microprocessor 100. The microprocessor 100 examines clock rate information received from the receiving unit 15, and determines the protocol of the incoming signal $S_{in}$, corresponding to that data rate. Based on this determination, the microprocessor 100 selects the logic configuration for a programmable link termination unit PLT 10. PLT 10 is then configured according to this protocol.

New protocols may be subsequently added to the microprocessor 100, as they emerge.

PLT 10 is inserted between the receiving unit 15 and a mapping unit 20. PLT unit 10 could be a field re-programmable gate array, or could be another programmable circuit. The PLT 10 performs the functions specific to the protocol corresponding to bit rate R1 if it exists, or passes through the signal for unanticipated clock rates. PLT 10 may perform framing, error counts, code conversion, may corrects parity, and may perform other performance monitoring actions specific to the protocol on the input signal $S_{in}$.

For example, if rate R1 of signal 12 is that of a video signal, or identifies a gigabit Ethernet, an OC—N, or any other signal, the PLT 10 frames on that signal, computes and reports performance parameters, and removes any line coding.

If rate R1 of signal 12 is that of a recognized wrapped signal, PLT 10 frames on the wrapper, computes and reports performance parameters, and removes the wrapper.

If rate R1 of signal 12 is not recognized, the signal is passed through, and the PLT reports a minimal set of performance monitoring parameters, such as e.g. optical signal strength, clock continuity, jitter and clock rate.

Signal 12', herein called a data signal, is provided by PLT 10 to a mapping unit 20, which maps the data into an STS-N synchronous payload envelope, shown at 12". As indicated above, SONET/SDH technology is used by way of example, other technologies may be equally employed. In this specification, the synchronous signal is also defined as a container signal, in that it contains the user signal, mapped into a fixed length container according to the mapping algorithm of mapping unit 20.

The POH (path overhead) information is multiplexed into the relevant fixed stuff bits by multiplexer 25, and the STS-N is passed to the time slot interchange block 30 for cross-connection and transmission over the back-plane. Block 30 re-arranges the fixed stuff bits with the POH information into the time-slots recognized by the SONET/SDH equipment of network 5.

In the embodiment of FIG. 2, the signal $S_{out}$ is converted to an optical format $O_{out}$ by transmission equipment 6, and thereafter launched towards its destination over the high speed network 5.

In another embodiment, the PLT 10 could be off-line, to avoid delays in the start of transmission, in which case it could not perform coding changes or parity correction.

In the receive direction, a signal $O_{in}'$ of a standard rate R', received from high speed network 5 in optical format is converted to an electronic format by receive equipment 7. If network 5 is a SONET?SDH network, $O_{in}'$ is a signal formatted according to the SONET/SDH protocol. A time slot interchange unit 30' rearranges (crossconnects) the fixed stuff bits with the POH information in the time-slots recognized by a reverse mapping unit 20'. The path performance monitoring bytes are extracted from the respective timeslots in POH demultiplexer 25', and the performance parameters are computed and used in the known way.

A reverse mapping unit 20' reverse maps the container signal 22" to its original format. Unit 20' receives the signal 22" from demultiplexer 25', and also receives SONET clock 24 and function β, and outputs the data signal 22' at the rate of the data clock 14. Data clock 14 and function β are received over network 5 through signalling, while the SONET/SDH clock is available locally. Function β gives to the reverse mapping unit 20' the size of the block, information about the phase difference between the data clock and the SONET/SDH clock accumulated over the current block and the number of the valid bits in the next block.

The data signal 22' is then applied to a programmable link instigation unit PLI 10'. PLI 10' is configured by microprocessor 100 according to the protocol for user signal 22 corresponding to bit rate R1 if it exists, or passes through the signal for unanticipated clock rates. PLI 10' may perform framing, error counts, code conversion, may corrects parity, declare alarms, and may perform other performance monitoring actions specific to the protocol of the output signal $S_{out}'$, as well as specific reporting whenever requested by the user.

For example, PLI 10' performs one of the following functions in a manner specific for user signal $S_{out}'$:

If rate R1' of signal $S_{out}'$ is that of a video signal, or identifies a gigabit Ethernet, an OC—N, etc, the PLI 10' frames the signal, computes and reports performance parameters, and adds the respective line coding.

If rate R1' of signal $S_{out}'$ is that of a recognized wrapped signal, PLI 10' frames on the wrapper, reports performance parameters, and adds the required wrapper. The PLI 10' also co-ordinates generation of the fractionally higher clock rate by the frequency agile transmitter 15'.

If the rate R1' is not recognized, the signal is passed through, and PLI 10' reports a reduced set of performance monitoring parameters such as clock continuity, jitter and clock rate.

The user signal 22 is sent to a frequency agile transmitter unit 15' which provides $S_{out}'$ to the user in the format of choice.

It is also to be appreciated that the rates R1 and R1' (and the corresponding rates R and R') could be the same or different.

The size N of the synchronous envelope can be pre-provisioned by the user. For example, N could be between 2 and 60 for a low speed variant of the transparent terminal which is used for speeds between 100 MB/s and 3 Gb/s. N could be a multiple of 12 between 48 and 240 for a high speed variant, which is used for speeds between 2 GB/s and 13 Gb/s.

While the invention has been described with reference to particular example embodiments, further modifications and improvements which will occur to those skilled in the art, may be made within the purview of the appended claims, without departing from the scope of the invention in its broader aspect.

What is claimed is:

1. A transparent port for a high rate network comprising:
   a receiver unit for receiving an incoming signal of an arbitrary data rate R1 and extracting a user signal and a data clock;
   a programmable link termination PLT for reporting a set of performance parameters for said incoming signal; and
   a processing unit for recognizing a plurality of provisioned protocols, selecting a first protocol characterizing said incoming signal and configuring said PLT according to said first protocol, wherein said PLT translates said user signal into a data signal whenever said rate R1 corresponds to a provisioned first protocol and passes said user signal unchanged whenever said rate R1 is not recognized by said processing unit.

2. A transparent port as claimed in claim 1, wherein said PLT performs one or more of a framing, an error count, a code conversion, and a parity correction operation.

3. A transparent port as claimed in claim 1, further comprising a mapping unit for rearranging the bits of said data signal into a container signal of a rate R corresponding to a second protocol.

4. A transparent port as claimed in claim 1, wherein sad PLT comprises logic gates configured to perform measurement of a provisioned parameter.

5. A transparent port as claimed in claim 1, wherein said PLT is a programmable gate array.

6. A transparent port for a high rate network comprising:
   a receiver unit for receiving an incoming sign of an arbitrary data rate R1 and extracting a user signal and a data clock;
   a programmable link termination PLT for reporting a set of performance parameters for said incoming signal; and
   a processing unit for recognizing a plurality of provisioned protocols, selecting a first protocol characterizing said incoming signal and configuring said PLT according to said first protocol wherein said set of performance parameters includes a previous section fail indicator.

7. A transparent port as claimed in claim 6, wherein said set of performance parameters includes one or more of signal strength, clock continuity and jitter.

8. A transparent port as claimed in claim 6, wherein said PLT performs one or more of a framing, an error count, a code conversion, and a parity correction operation.

9. A transparent port for a high rate network comprising:
   a programmable link instigation PLI for reporting a set of performance parameters for a data signal of an arbitrary rate R1';
   a processing unit for recognizing a plurality of provisioned protocols, selecting a first protocol characterizing said data signal and configuring said PLI according to said first protocol;
   a transmitter unit connected to said PLI for launching an outgoing signal of said first protocol, comprising user information within said data signal; and
   a reverse mapping unit for rearranging the bits of a container signal of a second protocol into said data signal of said first protocol.

10. A transparent port as claimed in claim 9, wherein said PLI translates said data signal into a user signal whenever said rate R1' corresponds to a provisional first protocol, and passes said data signal unchanged whenever said rate R1 is not recognized by said processing unit.

11. A transparent port as claimed in claim 9, wherein said PLI comprises logic gates configured to perform measurement of a provisioned parameter.

12. A transparent port as claimed in claim 9, wherein said PLI is a programmable gate array.

13. A transparent port as claimed in claim 9, wherein said set of performance parameters includes a previous section fail indicator.

14. A transparent port as claimed in claim 9, wherein said set of performance parameters includes signal strength, clock continuity and jitter.

15. A transparent port as claimed in claim 9, wherein said PLI performs one or more of a framing, an error count, a code conversion, and a parity correction operation.

16. A method for transmitting a continuous digital signal of an arbitrary rate R1 over a synchronous network as a transparent tributary, comprising:
   at a transmit terminal, selecting a container signal of a rate R, higher than said rate R1;
   detecting the rate R1 of said continuous digital signal and determining a first protocol corresponding to said rate R1;
   measuring according to a first protocol a set of performance parameters on said continuous signal and reporting said set of performance parameters; and
   translating said set of performance parameters from said first protocol to a second protocol characterizing said container signal and providing said translated set into said container signal.

17. A method as claimed in claim 16, further comprising transmitting said container signal from said transmit terminal to a receive terminal.

18. A method as claimed in claim 16, further comprising informing said receive terminal of said rate R1 and of said first protocol through signaling.

19. A method as claimed in claim 18, further comprising:
at the receive terminal, receiving said container signal;
extracting said set of performance parameters from said container signal; and
reconstituting said continuous signal based on said rate R1.

20. A method as claimed in claim 19, further comprising transmitting said continuous signal with said set of performance parameter to a user.

21. A transparent port for a high rate network comprising:
a programmable link instigation PLI for reporting a set of performance parameters for a data signal of an arbitrary rate R1';
a processing unit for recognizing a plurality of provisioned protocols, selecting a first protocol characterizing said data signal and configuring said PLI according to said first protocol;
a transmitter unit connected to said PLI for launching an outgoing signal of said first protocol, comprising user information within said data signal; wherein said PLI translates said data signal into a user signal whenever said rate R1' corresponds to a provisional first protocol, and passes said data sigal unchanged whenever said rate R1 is not recognized by said processing unit.

22. A transparent port as claimed in claim 21, wherein said PLI comprises logic gates configured to perform measurement of a provisioned parameter.

23. A transparent port as claimed in claim 21, wherein said PLI is a programmable gate array.

24. A transparent port as claimed in claim 21, wherein said set of performance parameters includes a previous section fail indicator.

25. A transparent port as claimed in claim 21, wherein said set of performance parameters includes signal strength, clock continuity and jitter.

26. A transparent port as claimed in claim 21, wherein said PLI performs one or more of a framing, an error count, a code conversion, and a parity correction operation.

27. A transparent port for a high rate network comprising:
a programmable link instigation PLI for reporting a set of performance parameters for a data signal of an arbitrary rate R1', wherein said set of performance parameters includes a previous section fail indicator;
a processing unit for recognizing a plurality of provisioned protocols, selecting a first protocol characterizing said data signal and configuring said PLI according to said first protocol; and
a transmitter unit connected to said PLI for launching an outgoing signal of said first protocol, comprising user information within said data signal.

28. A transparent port as claimed in claim 27, wherein said PLI comprises logic gates configured to perform measurement of a provisioned parameter.

29. A transparent port as claimed in claim 27, wherein said PLI is a programmable gate array.

30. A transparent port as claimed in claim 27, wherein said PLI performs one or more of a framing, an error count, a code conversion, and a parity correction operation.

31. A transparent port as claimed in claim 21, wherein said set of performance parameters includes a previous section fail indicator.

* * * * *

UNITED STATES PATENT AND TRADEMARK OFFICE
CERTIFICATE OF CORRECTION

PATENT NO. : 6,937,614 B1  Page 1 of 1
APPLICATION NO. : 09/438516
DATED : August 30, 2005
INVENTOR(S) : Roberts et al.

It is certified that error appears in the above-identified patent and that said Letters Patent is hereby corrected as shown below:

At column 7, line 56, should read, 4. A transparent port as claimed in claim 1, wherein said At column 7, line 62, should read, a receiver unit for receiving an incoming signal of an At column 9, line 2, should read, at the receiver terminal, recovering said container signal;

Signed and Sealed this

Twenty-third Day of January, 2007

JON W. DUDAS
*Director of the United States Patent and Trademark Office*